United States Patent [19]

Kopecek et al.

[11] 3,931,111

[45] Jan. 6, 1976

[54] SOLUBLE HYDROPHILIC POLYMERS AND PROCESS FOR PROCESSING THE SAME

[75] Inventors: Jinrich Kopecek; Jiri Vacik, both of Prague; Ladislav Sprincl, Prague-Stodulky, all of Czechoslovakia

[73] Assignee: Ceskoslovenska akademie ved, Prague, Czechoslovakia

[22] Filed: Feb. 26, 1973

[21] Appl. No.: 335,748

[30] Foreign Application Priority Data

Feb. 29, 1972  Czechoslovakia............... 1333-72

[52] U.S. Cl.... 260/67 R; 260/29.2 TN; 260/29.2 N; 260/29.2 UA; 260/29.6 H; 260/29.6 HN; 260/77.5 CR; 260/80.3 N; 260/856; 424/78

[51] Int. Cl.²................. C08G 2/38; C08G 18/62; A61K 31/785

[58] Field of Search ............ 260/2.5 AD, 77.5 CR, 260/77.5 D, 29.6 H, 29.6 HN, 67, 260/29.2 TN; 424/78

[56]  References Cited

UNITED STATES PATENTS

| | | | |
|---|---|---|---|
| 3,245,941 | 4/1966 | Mayer et al. ............... | 260/77.5 CR |
| 3,326,823 | 6/1967 | Landler et al.............. | 260/2.5 AD |
| 3,382,090 | 5/1968 | Meisel et al................ | 260/2.5 AD |
| 3,575,946 | 4/1971 | Chromecek et al. ......... | 260/29.6 H |
| 3,577,522 | 5/1971 | Hymes.................. | 424/78 |
| 3,590,125 | 6/1971 | Hymes.................. | 424/78 |
| 3,607,848 | 9/1971 | Stoy et al................ | 424/81 |
| 3,787,474 | 1/1974 | Daniels et al........... | 424/78 |
| R27,151 | 6/1971 | Hicks.................... | 260/77.5 CR |

FOREIGN PATENTS OR APPLICATIONS 802,740  10/1958  United Kingdom ......... 260/77.5 CR

OTHER PUBLICATIONS

Saunders et al., Polyurethanes Part I., Interscience, New York, (1962), pp. 111, 338.

*Primary Examiner*—H. S. Cockeram

[57]  ABSTRACT

Soluble, hydrophilic polymers suitable for medical use and as blood plasma substitutes comprising low molecular weight polymer derived from at least one monomer of an acrylamide type material or a mono-ester of an acrylic type acid and a glycol which is condensed with bifunctional compounds to form a condensation polymer having increased molecular weight and enzymatically cleavable cross-links. The hydrophilic polymer is produced by polymerizing the acrylamide type material or monoester mentioned above to form a low molecular weight polymer which is then condensed with a bifunctional compound to form a high molecular weight condensation polymer having enzymatically cleavable cross-links.

11 Claims, No Drawings

SOLUBLE HYDROPHILIC POLYMERS AND PROCESS FOR PROCESSING THE SAME

BACKGROUND OF THE INVENTION

This invention relates to soluble hydrophilic polymer suitable for medical use and as blood plasma substitutes and to a process for making the same.

Various substitutes for blood plasma consisting of dilute solutions of hydrophilic polymers either natural, such as dextran or gelatin, or synthetic, such as polyvinylpyrrolidone are known.

The molecular weight of such polymers is one of the most important characteristics of supplementary infusion solutions of such polymers used for clinical purposes. The molecular weight influences the elimination of the infusion solution from the blood circulation, its elimination by urine, its retention in the organism, in which the solution is used, sedimentation of erythrocytes and toxicity as well as the immunological properties. In addition, the shape of molecule has important effects also Molecular polydispersity, that is, dispersion of the high molecular weight material, such as by degradation to lower weight portions, remains the main problem. Products containing rather large high molecular weight fractions are generally biologically unfavorable. However, rather small molecules escape rapidly from the blood circulation system and, therefore, are inefficient. It has been found in the study of colloidal infusion solutions which were formerly used, that they are detained in RES, that is, in the reticulo-endothelial system of adrenal glands, milt and lungs, the cells of the liver parenchyma, the epithelium of the coiled channels of the kidney and numerous other organs and tissues, such as tissues in lungs, pancreas,, brain, skin, muscles etc. The results found differed according to the molecular weight values.

To enable substantially perfect and complete elimination of synthetic polymers from an organism, a definite region of molecular weights has to be maintained, since higher molecular weights bring about the danger of retention in the organism and blocking of the RES. It is difficult to reach and maintain this accurate molecular weight region in large-scale industrial production. Therefore, it is advantageous to use molecules which are split in the organism. Such molecules or compounds have a good osmotic effect in clinical application and increase to a fair extent the amount of circulating liquid and ameliorate the critical state of a patient. After the molecules have been split, their molecular weight is low enough, so that they penetrate the kidneys by filtration without difficulty and are not detained in the blood circulation system or deposited in the RES.

A disadvantage of gelatin, either high molecular weight or partially degraded material, is its low stability in the organism because it is readily split by enzymes so far as to form amino acids which are both metabolized and easily separated from the organism. In addition, preparations made from degraded gelatin combining it into larger molecules by means of diisocyanates possess this disadvantage also since the urea bridges between individual peptide molecules cannot protect the peptide bonds from cleavage, even though they are split at a slower rate than peptides per se. This is the reason that the properties of plasma substitutes of the gelatin type change relatively quickly and are optimal only in the beginning, immediately after infusion.

Quite the reverse effect occurs with common synthetic polymers. They are not split enzymatically at all and are accumulated in the organism causing injury of it. On the other hand, when the average degree of polymerization is decreased to the extent that the polymers are separated by the kidneys, the properties of the substitutes are not optimal in any respect. First of all, the colloidal osmotic pressure is too high, especially in the beginning, and it decreases only gradually as the polymer is removed from the body of the organism. This unfavorably influences the water content in intercellular spaces and cells.

There exists, therefore, a need to provide materials which do not exhibit the above mentioned disadvantages.

OBJECTS OF THE INVENTION

Accordingly, it is a primary object of this invention to provide soluble, hydrophilic polymers suitable for medical use and as blood plasma substitutes.

It is a further object of the invention to provide soluble, hydrophilic polymers suitable for medical use and as blood plasma substitutes comprising low molecular weight polymer derived from at least one monomer of an acrylamide type material or a mono-ester of an acrylic type acid and a glycol which is condensed with a bifunctional compound to form a condensation polymer having increased molecular weight and have crosslinks cleavable in the presence of appropriate enzymes.

It is still another object of the invention to provide a process for making the soluble, hydrophilic polymers which are suitable for medical use and as blood plasma substitutes.

Other objects and advantages of the invention will be apparent from the following description thereof.

SUMMARY OF THE INVENTION

In accordance with the invention, soluble hydrophilic polymers suitable for medical use and as blood plasma substitutes comprise low molecular weight polymer derived from at least one monomer selected from the group consisting of N-alkyl methacrylamides, N-alkyl acrylamides, N,N-dialkyl acrylamides or monoesters of acrylic and methacrylic acids with di-, tri- and higher homologous polyethylene glycols or mixtures thereof in any proportion, wherein the alkyl radicals are selected from the group consisting of unsubstituted and substituted alkyl radicals, the substituents therein being selected from the group consisting of hydroxy, amino and alkoxy groups. The low molecular weight polymer has an average molecular weight in a range of from about 10,000 to about 60,000 and containing up to 1% maximum of a fraction having a molecular weight above about 100,000. The low molecular weight polymer is then condensed with at least one bifunctional compound to a condensation polymer having a molecular weight in a range of from about 60,000 to about 250,000 and having cleavable in the presence of appropriate enzymes.

Preferably, the alkyl radicals contain one to three carbon atoms and the hydroxy, amino, and alkoxy groups contain one to six carbon atoms.

The process for making the described polymers comprises the steps of polymerizing in the presence of a chain transfer agent at least one of the monomers described above and forming the low molecular weight polymer and then condensing that polymer with the bifunctional compound and forming the condensation.

DESCRIPTION OF PREFERRERD EMBODIMENTS

In accordance with the invention, polymers comprising one of the monomers or mixtures of the monomers mentioned above can also be made. In addition, if desired, up to 49 mol percent of the aforementioned monomers can be replaced by acrylamide, methacrylamide or monolefinic monomers containing an — NH — group such as alkylamino acrylates or methacrylates and the respective alkyl may be substituted by one or more amino, alkylamino, hydroxy or alkoxy groups and the polymers preferably have an average molecular weight in a range of from about 20,000 to about 30,000 while at the same time the total water solubility of the polymers is maintained. Since treatment with the bifunctional compounds which are condensed through their functional groups with the polymeric groups having an active hydrogen atom form. They contain in this way, cleavable cross-links in the presence of appropriate enzymes.

Suitable bifunctional compounds are, for example, diisocyanates, halides of dicarboxylic acids which may contain a peptide or other enzymatically cleavable bond in their chain, phosgene, or dialdehydes derived from dicarboxylic acids.

The polymerization of the above mentioned monomers is advantageously carried out in the presence of a solvent, such as water, methanol, ethanol, dimethylformamide and other additive polymerization catalyst, such as 2,2'-azo-bis-(methyl isobutyrate), diisopropyl perorocarbonate. The average degree of polymerization becomes not only lower but the groups formed become also more equal and uniform, that is the molecular weight distribution becomes narrower.

Polymerization is carried out at temperatures in a range of from about 0°C. to about 90°C. and preferably in a range about 40°C. to about 70°C.

In addition to the major application of the polymers and copolymers, as a substitute for blood plasma, they can be used also for other medical purposes. Thus, for example, solutions of these polymers, especially those of higher molecular weight, may be used for topical application, such as the coating of surface wounds and burns, or for cosmetic purposes as carrier or adjunct of suitable biologically active compounds, as well as also for carriers of biologically active compounds in the blood circulatory system.

The reaction with at least bifunctional condensation agents is carried out in solvents such as dimethylformamide, dimethylsulphoxide which do not react with the participating components. Polyisocyanates can be used either in free or blocked form, similarly as in production of polyurethanes and polyureas.

The polymers and their solutions, according to the invention, are entirely non-toxic and they do not develop allergic or other reactions. Further, they are not antigens, are stable and do not interfere in the determination of normal blood groups.

The infusion solutions were tested in the treatment of the haemorrhagic shock in rabbits with good results. For instance, the copolymer of N-ethyl methacrylamide with acrylamide (mole ratio 8 : 2) additionally cross-linked with hexamethylenediisocyanate was used for the sensitization of an organism. The sensitization was carried out with five rabbits of identical sex and average weight of 2.5 kg, by injecting subcutaneously five 2 ml doses of the polymer solution in four-day intervals. The results were evaluated by biological tests and by serological methods 30 days after the last sensitizing dose had been applied. Non-sensitized rabbits were used as the comparative standards for biological tests and the normal rabbit serum and physiologic saline were standards for the serological methods.

RESULTS

A. Biological Tests

After the thirty-day interval had passed since sensitization, the Arthus reaction was developed by the intracutaneous injection of 1 ml of the material. The histological investigation of the place by intracutaneous puncture after 4 to 48 hours did not show any difference from the standard group and the reaction evaluated as negative.

Anaphylactic reaction was also developed 30 days after the last sensitizing injection, by injecting 20–50 ml of the solution into the heart. No reaction occured in the experimental animals.

B. Serological Methods

Serologically, agglutination tests were used. A drop of the tested polymer solution was mixed with one drop of serum from sensitized animals. The blank or control was carried out with a normal serum and with physiological saline solution. The results were read after 5, 10, 15, and 20 minutes under a microscope. Agglutination did not occur in any of the tests.

Agglutination was also carried out in 12 ml conical test tubes, where 0.5, 1, 2, 3, and 4 ml of serum was mixed with 3 ml of the polymer solution. The results were checked with a normal serum and physiologic saline solution. No agglutination occured in all of these tests.

Ouchterlony's method of two-directional double diffusion was used to test the material. The material was placed into a middle reservoir (16 mm in diameter) in a Petri dish with agar and the serum of sensitized rabbits was placed into the surrounding reservoirs (12 mm in diameter) at a 10 mm distance from the middle reservoir. The dishes were kept for four weeks in a refrigerator. No diffusion of antibodies was observed.

Active anaphylaxis by the copolymer of N-ethyl methacrylamide with acrylamide (mol. ratio 8 : 2) was followed with animals. By all methods used, as agglutination on glass plates, agglutination in test tubes, gel diffusion, Arthus reaction, and developing of the anaphylactic shock, the formation of antibodies was not shown.

All solutions prepared according to the invention can be used, for example, to treat blood loss of various origins (injuries), in bleeding states, for treatment of shocks, for extracorporeal circulation (e.g. for an artificial heart), for burns, and for high losses of blood liquids.

The invention is further illustrated in the following examples. In the examples, all parts and percents are by weight unless otherwise stated, and molecular weight was determined by use of Ubbelohde viscometer.

EXAMPLE 1

Into a reaction vessel there was weighte 15 grams of N-(2-hydroxypropyl) methacrylamide, 2 grams of 2,2'-azo-bis (methyl isobutyrate), 100 grams of water and 80 grams of methanol. Nitrogen was bubbled through the reactants and they were polymerized at 60°C under an inert atmosphere for 5 hours. After the reaction was completed, the mixture was poured into a tenfold amount of acetone or other precipitant. The precipitated polymer was filtered, washed and dried in vacuum. Viscosity of a 2.8 % w/w aqueous solution of the polymer is 1.9 cP, determined in Ubbelohde viscometer. The molecular weight was 55.000 An intermediate material was then produced for formation of a synthetic infusion solution.

EXAMPLE 2

Into 5 grams of a 10 % w/w dimethylformamide solution of the polymer prepared according to Example 1, 0.075 ml of hexamethylene diisocyanate was added and the reaction was carried out in a sealed ampoule at 60°C for 3 hours. After the reaction was completed, the polymer was precipitated into a tenfold excess of acetone. The precipitated polymer was filtered and dried in a vacuum. Viscosity of a 2.8 % aqueous solution of this polymer is 3.6 cP, determined as in Example 1, and corresponds to a molecular weight increase of several times. The resulting polymer contains urethane linkages which are enzymatically cleavable. A synthetic infusion solution and/or carrier used for the aforementioned purposes was prepared from this polymer by dissolving it in physiologic saline solution.

EXAMPLE 3

Into 5 grams of 10 % w/w dimethylformamide solution of the polymer prepared according to Example 1, 0.05 ml of toluene-2,4-diisocyanate was added and the reaction was carried out in a sealed ampoule at 60°C for 3 hours. Further procedure identical with Example 2 was then carried out. Viscosity of 2.8 % aqueous solution of the resulting polymer is 2.1 cP, determined in Ubbelohde viscometer. Molecular weight was 80000.

EXAMPLE 4

A reaction vessel was charged with 20 grams of N-ethyl methacrylamide, 5 grams of acrylamide, 1.9 grams of 2,2'-azo-bis(methyl isobutyrate) and 400 grams of methanol and bubbled through with nitrogen to remove dissolved oxygen. Polymerization was carried out at 60°C for 6 hours. After the reaction was completed, the mixture was poured into a tenfold excess of the precipitatant, e.g. acetone. The precipitated polymer was filtered, dried in a vacuum, and dissolved in dimethylformamide to a 10 % solution. Into 10 grams of this solution, 0.045 ml of toluene-2,4-diisocyanate was added and the reaction was carried out at 60°C for 4 hours. The polymer was obtained by precipitation and drying and contains cleavable urea bridges. A synthetic infusion and/or carrier solution used for the purposes aforementioned was prepared by dissolving this polymer in a physiologic saline solution. The polymer had a molecular weight of 110000.

EXAMPLE 5

A reaction vessel was charged with 8 parts of N-ethyl acrylamide, 2 parts of 2-aminoethyl methacrylate, 1 part of benzoyl peroxide and 200 parts of ethanol. The mixture was polymerized under an inert atmosphere at 50°C for 10 hours. After the reaction was completed, the mixture was precipitated in a tenfold excess of a precipitant, e.g. diethylether. The polymer was filtered, dried and dissolved in dimethylsulphoxide to a 15 % solution. The solution formed (200 parts) was treated with 1 part of 4,4'-diphenylmethane diisocyanate for 2 hours at 70°C. After precipitation and drying the polymer obtained had higher molecular weight and contained both urea and urethane bridges. A synthetic infusion solution was prepared by dissolving this polymer in a physiologic saline. The polymer had a molecular weight of 150000.

EXAMPLE 6

Into 10 grams of the solution prepared according to Example 4, 0.5 ml of triethylamine was added and the mixture was fed a moderate stream of phosgene at the temperature 25°C–30°C. After the reaction was completed, the mixture was neutralized, precipitated in acetone, filtered, and the polymer was dried. A synthetic infusion is prepared from this polymer by dissolving in a physiologic saline solution. The polymer had a molecular weight of 220000.

EXAMPLE 7

A glass ampoule was charged with 28 grams of N-(2-hydroxypropyl) methacrylamide, 5 grams of p-aminostyrene, 0.2 grams of methyl azo-bisisobutyrate, 150 grams of methanol, and 0.1 gram of butylmercaptan, bubbled through with nitrogen and polymerization was carried out in an inert atmosphere at 50°C for 10 hours. After the reaction was completed, the mixture was poured into a tenfold amount of acetone. The precipitated polymer was filtered, washed with diethylether and dried in a vacuum to a constant weight. The molecular weight was 25000.

EXAMPLE 8

Into 50 grams of a 10 % w/w dimethylformamide solution of the polymer prepared according to Example 7, 1 ml of a 10 % w/w solution of the dichloride of glutaric acid was added at 0°C. The reaction temperature was slowly elevated to 50°C in an inert atmosphere. After 5 hours being maintained at the given temperature, the reaction was cooled and precipitated by pouring into a tenfold amount of a acetone — ether (1 : 1) mixture. The polymer was filtered, washed, dissolved in methanol and reprecipitated into a mixture acetone — ether (1 : 1). The polymer was again filtered, washed and dried in a vacuum to a constant weight. The polymer obtained has the molecular weight several time higher than the molecular weight of the starting polymer and formed a synthetic infusion solution by dissolving it in a physiologic saline to the solution of viscosity about 2–3 cP, as determined in Example 2. Before application, the solution was sterilized in an autoclave at 120°C for 30 minutes. The molecular weight was 90000.

EXAMPLE 9

A 5 % w/w dimethylformamide solution (25 grams) of the polymer prepared according to Example 7 was treated with 0.08 ml of toluene-2,6-diisocyanate in a sealed ampoule at 50°C for 15 hours. After the reaction was completed, the procedure was carried on as it is given in Example 2. The polymer had a molecular weight of 72000.

EXAMPLE 10

To 25 grams of a 10 % w/w dimethylsulphoxide solution of the polymer prepared according to Example 7, 5 ml of a 5 % w/w dimethylsulphoxide solution of phosgene was added at 0°C. The mixture was treated in a sealed ampoule at 35°C for 5 hours. After the reaction was completed, the procedure was carried on as it is given in Example 8. The polymer had a molecular weight of 217000.

EXAMPLE 11

A 8 % w/w aqueous solution (30 grams) of the polymer prepared according to Example 7 was treated with 1 ml of 10 % HCl and 0.5 ml of glutaric aldehyde at 30°C for 10 hours. The polymer was then precipitated into acetone, washed, dried, dissolved in methanol and reprecipitated in ether. After filtration and washing, the polymer was dried to a constant weight. The polymer obtained was used as a carrier of biologically active compounds in the blood circulation. It had a molecular weight of 69000.

EXAMPLE 12

A solution of 0.2 gram of hexamethoxymethylmelamine in 10 ml of water and 1 ml of 10 % HCl was added to 20 grams of a 10 % w/w aqueous solution of the polymer prepared according to Example 7. This mixture was heated to 90°C for 10 hours and then cooled. The polymer was precipitated into acetone and further processed as described in Example 11. The polymer had a molecular weight of 765000.

EXAMPLE 13

A glass ampoule was charged with 10 grams of monomethacrylate of diethylene glycol, 15 grams of monomethacrylate of tetraethylene glycol, 2 grams of ethylaminoethyl methacrylate, 200 grams of methanol, 0.1 gram of carbon tetrabromide, and 1 gram of diisopropyl peroxocarbonate, bubbled through with nitrogen and sealed under an inert atmosphere. The ampoule was heated in a thermostated bath to 50°C for 7 hours and then it was cooled. The polymer was precipitated into a fifteenfold amount of diethylether, filtered, washed and vacuum-dried to a constant weight. A 15 % w/w dimethylformamide solution (50 grams) of the given polymer was treated with 0.05 ml of hexamethylenediisocyanate at 60°C for 10 hours. The resulting polymer was precipitated into diethylether, filtered and dried to a constant weight. A synthetic infusion solution was prepared by dissolving this polymer in a physiologic saline to the solution of viscosity 2,2 cP. The polymer had a molecular weight of 142000.

EXAMPLE 14

A reaction vessel was charged with 10 grams of N,N-diethyl acrylamide, 10 grams of monomethacrylate of triethylene glycol, 10 grams of 2-aminobutylacrylamide, 350 grams of ethanol, and 15 grams of methyl azo-bis-isobutyrate and the mixture was polymerized under an inert atmosphere at 55°C for 15 hours. The resulting polymer was precipitated by pouring the reaction mixture into a fifteenfold amount of diethylether. Further procedure was carried out as described in Example 13. The polymer had a molecular weight of 173000.

EXAMPLE 15

A mixture of 15 grams of N-acryloyl morpholine, 5 grams of methylaminoethyl acrylate, 15 grams of monoacrylate of triethylene glycol, 400 grams of methanol, and 10 grams of diisopropyl peroxocarbonate was polymerized under an inert atmosphere at 45°C for 10 hours. The resulting polymer was precipitated into an excess of diethylether, filtered, washed and dried to a constant weight. The polymer was further processed as described in Example 8. The molecular weight was 131000.

What is claimed is:

1. A water soluble hydrophilic low molecular weight polymer suitable for medical use including blood plasma substitute comprising the polymerizate of at least one monomer selected from the group consisting of N-alkyl methacrylamides, N-hydroxyalkyl methacrylamides, N-alkyl acrylamides, N-hydroxyalkyl acrylamides, N,N-dialkyl acrylamides, and mono-esters of acrylic and methacrylic acids with di-, tri- and higher homologous polyethlene glycols wherein the alkyl radicals are selected from the group consisting of unsubstituted and substituted alkyl radicals, the substituents being selected from the group consisting of hydroxy, amino and alkoxy groups, said low molecular weight polymer having an average molecular weight in a range of 10,000 to 60,000 and containing up to 1% maximum of a fraction having a molecular weight above 100,000, said low molecular weight polymer being condensed with at least one bifunctional compound selected from diisocyanates, halides of dicarboxylic acids, phosgene and dialdehydes derived from dicarboxylic acids to form a condensation polymer having a molecular weight in a range of 60,000 to 250,000 and having cleavable cross-links.

2. The polymer as defined in claim 1 wherein said alkyl radicals contain from one to three carbon atoms and the hydroxy, amino, and alkyl groups contain from one to six carbon atoms.

3. Soluble hydrophilic polymers as defined in claim 1 wherein up to 49 mol % of the monomer is replaced with a material selected from the group consisting of acrylamide, methacrylamide and monolefinic monomers containing an — N H — group.

4. Soluble hydrophilic polymers as defined in claim 1 wherein the low molecular weight polymer is a copolymer.

5. A soluble hydrophilic polymer as defined in claim 1 comprising a hexamethylene diisocyanate cross-linked copolymer comprising N-ethyl methacrylamide with acrylamide in a molar ratio of 8 to 2, respectively.

6. A process for making water soluble, hydrophilic polymers suitable as blood plasma substitutes comprising the steps of polymerizing, in the presence of a chain transfer agent, at least one monomer selected from the group consisting of N-alkyl methacrylamides, N-alkyl acrylamides, N,N-dialkyl acrylamides and mono-esters of acrylic and methacrylic acids with di-, tri- and higher homologous polyethylene glycols wherein the alkyl radicals are selected from the group consisting of unsubstituted and substituted alkyl radicals and the substituents therein are selected from the group consisting of hydroxy, amino and alkoxy groups, for a sufficient time to form a low molecular weight polymer having an average molecular weight in a range of 10,000 to 60,000 and containing up to 1% maximum of a fraction having a molecular weight above 100,000, thereafter condensing said low molecular weight polymer with at least one bifunctional compound selected from diisocyanates, halides of dicarboxylic acids, phosgene and dialdehydes derived from dicarboxylic acids in an amount sufficient to form a condensation polymer having a molecular weight in a range of 60,000 to 250,000 and having cleavable crosslinks.

7. The process according to claim 6 wherein said alkyl radicals contain from one to three carbon atoms and the hydroxy-alkyl and amino-alkyl group contains from one to six carbon atoms.

8. The process as defined in claim 6 wherein up to 49 mol % of the monomer is replaced with a material selected from the group consisting of acrylamide, methacrylamide and monoolefinic monomers containing an —NH— group.

9. The process as defined in claim 6 wherein the monomer is N-(2-hydroxy-propyl) methacrylamide monomer.

10. The process as defined in claim 6 polymer is copolymer formed from N-ethyl methacrylamide with acrylamide in a molar ratio of 8 to 2, respectively and the bifunctional compound is hexamethylene diisocyanate.

11. Soluble hydrophilic polymer as defined in claim 1, wherein the monomer is N-(2-hydroxypropyl)methacrylamide.

* * * * *